United States Patent [19]
Genter et al.

[11] Patent Number: 5,882,013
[45] Date of Patent: *Mar. 16, 1999

[54] INTEGRATED GEAR HOUSING/AIR COMPRESSOR GASKET

[75] Inventors: David P. Genter; Mark A. Voils; J. Eric Parlow, all of Columbus, Ind.

[73] Assignee: Cummins Engine Company, Inc., Columbus, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 929,029

[22] Filed: Sep. 15, 1997

Related U.S. Application Data

[63] Continuation of Ser. No. 670,164, Jun. 27, 1996, abandoned.

[51] Int. Cl.[6] .................................................. F16J 15/02
[52] U.S. Cl. ........................ 277/598; 277/630; 277/917
[58] Field of Search ................................... 277/591, 598, 277/628, 630, 634, 917

[56] References Cited

U.S. PATENT DOCUMENTS

| | | | |
|---|---|---|---|
| 3,438,117 | 4/1969 | Engleman | 277/199 |
| 3,583,711 | 6/1971 | Engleman | 277/199 |
| 4,602,504 | 7/1986 | Barber . | |
| 4,676,514 | 6/1987 | Beutter et al. . | |
| 4,690,413 | 9/1987 | Adkins . | |
| 4,732,397 | 3/1988 | Gavin . | |
| 4,842,494 | 6/1989 | Speiser | 417/364 |
| 4,998,515 | 3/1991 | Carvalho | 123/195 C |
| 5,022,833 | 6/1991 | Kandpal et al. . | |
| 5,343,837 | 9/1994 | Ward et al. . | |
| 5,433,455 | 7/1995 | Nelson . | |

*Primary Examiner*—Anthony Knight
*Assistant Examiner*—John L. Beres
*Attorney, Agent, or Firm*—Woodard, Emhardt, Naughton, Moriarty & McNett

[57] ABSTRACT

A separable gasket for use in sealing the interface between a gear housing and an engine block as well as the interface between an air compressor and the gear housing includes a first gasket portion constructed and arranged for sealing the interface between the gear housing and the engine block and a second gasket portion constructed and arranged for sealing the interface between the air compressor and the gear housing. A third gasket portion in the form of a perforated score line is positioned between the first gasket portion and the second gasket portion. In the event the air compressor requires servicing, the present invention enables the second gasket portion to be manually flexed and ultimately separated from the first gasket portion so that a replacement gasket can be assembled when the air compressor is reassembled to the gear housing. By separating the second gasket portion from the first gasket portion, the servicing of the air compressor does not necessitate any disassembly of the gear housing from the engine block nor any replacement of the first gasket portion.

5 Claims, 3 Drawing Sheets

INTEGRATED GEAR HOUSING/AIR COMPRESSOR GASKET

This application is a continuation of application Ser. No. 08/670,164, filed Jun. 27, 1996, now abandoned.

BACKGROUND OF THE INVENTION

The present invention relates generally to the design of edge molded gaskets which are used to help seal an interface between two substantially flat surfaces. More particularly, the present invention relates to an integrated gasket wherein one portion is used for sealing a gear housing to the engine block interface and another portion is used for sealing a gear housing to the air compressor interface. A perforated score line separates the two gasket portions and this enables the air compressor portion to be separated from the engine block portion when only the air compressor has been accessed for service.

In a variety of diesel engine designs it is common for the interface between the gear housing and the engine block to be fitted with a sealing gasket, often a steel stamping. If the engine style includes an air compressor, the air compressor will typically be located adjacent to the engine block and will attach to the gear housing. It is typical for the interface between the gear housing and the air compressor to be fitted with a separate sealing gasket, often a steel stamping. With this particular arrangement involving two separate sealing gaskets, the gasket used between the air compressor and the gear housing can be replaced without having to replace the gasket disposed between the gear housing and the engine block. Accordingly, it is possible to separate the air compressor from the gear housing in order to work on the air compressor and when reassembling these two components, a new sealing gasket can be installed. The existing gasket positioned between the gear housing and the engine block is not disturbed. In view of the advantages of two separate gaskets as described, this approach has remained the standard in the industry.

If a single gasket is used for both interfaces, it would be necessary to either reuse the old gasket, which is not an acceptable practice, or disassemble the gear housing from the engine block and replace the entire gasket, even though the gasket portion disposed between the gear housing and the engine block does not need to be replaced for any other reason. By providing two separate sealing gaskets, the need or desire to replace one sealing gasket does not necessitate any change or replacement of the other sealing gasket.

To some extent the benefits of two separate sealing gaskets are offset by the fact that two separate stampings are required which means two sets of tooling to be created and maintained. Additionally, there are two separate components to be stocked and inventoried, and two separate components to be handled and assembled. These drawbacks can be lessened by going to one sealing gasket which combines or integrates the two sealing gasket portions. With one integrated sealing gasket, less tooling is required and there is less time required to install and position the gaskets at their corresponding interfaces between the two components which are being assembled.

The present invention uniquely provides the benefits of a single sealing gasket which is used for two interfaces with the advantages of two separate sealing gaskets. According to the present invention, a single-piece, steel stamping is fabricated with the required size and shape for sealing the interface between the gear housing and engine block as well as for sealing the interface between the gear housing and an air compressor. A perforated score line partitions the stamping into a first gasket portion for the first interface and a second gasket portion for the second interface. By bending the second portion back and forth along the perforated score line (i.e., work hardening), the second portion which seals the air compressor interface is able to be separated from the first gasket portion. As a consequence, the air compressor can be serviced and/or repaired without having to disassemble the gear housing from the engine block. Upon reassembly of the air compressor to the gear housing, a new separate sealing gasket is used.

Over the years, various patents have been issued on gaskets and gasket systems for a variety of uses and applications, including internal combustion engines. The following listed patents are believed to provide a representative sampling of such earlier patents:

| PATENT NO. | PATENTEE | ISSUE DATE |
|---|---|---|
| 5,022,833 | Kandpal et al. | Jun. 11, 1991 |
| 4,676,514 | Beutter et al. | Jun. 30, 1987 |
| 5,343,837 | Ward et al. | Sep. 6, 1994 |
| 4,690,413 | Adkins | Sep. 1, 1987 |
| 5,433,455 | Nelson | Jul. 18, 1995 |

Since the listed patents are representative of earlier gasket designs, it is important to note that the present invention is neither anticipated nor rendered obvious by any of the listed patents.

SUMMARY OF THE INVENTION

A separable gasket for use in sealing two different component-to-component interfaces according to one embodiment of the present invention comprises a first gasket portion constructed and arranged for sealing between a first component and a second component and a second gasket portion initially connected to the first gasket portion and separable therefrom, the second gasket portion being constructed and arranged for sealing between the first component and a third component.

One object of the present invention is to provide an improved integrated gear housing/air compressor gasket.

Related objects and advantages of the present invention will be apparent from the following description.

DESCRIPTION OF THE PREFERRED EMBODIMENT

Figure 1:
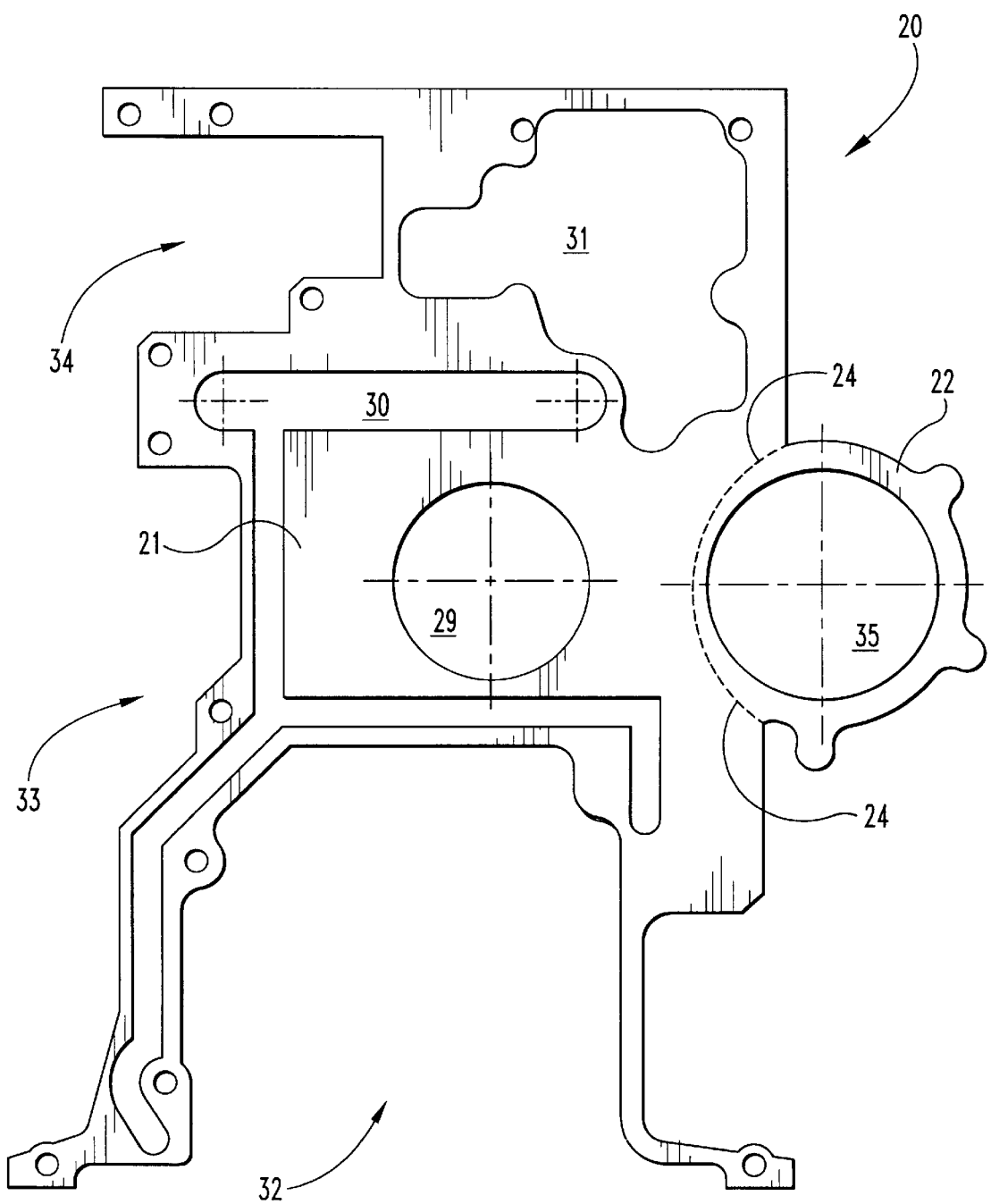
FIG. 1 is a top plan view of an integrated, separable gasket according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a unitary gasket 20 which according to the present invention is a substantially flat steel stamping. The irregular and complex shape of gasket 20 is well suited for a stamping operation as the means of fabrication. This fabrication method also enables high volume production with uniform and repeatable results. The use of steel for gasket 20 does not prevent the use of a stamping operation due to the fact that the gasket material thickness is approximately 0.75 mm. Although initially fabricated as a unitary member, gasket 20 is manually separable into two portions as will be described hereinafter.

Figure 2:
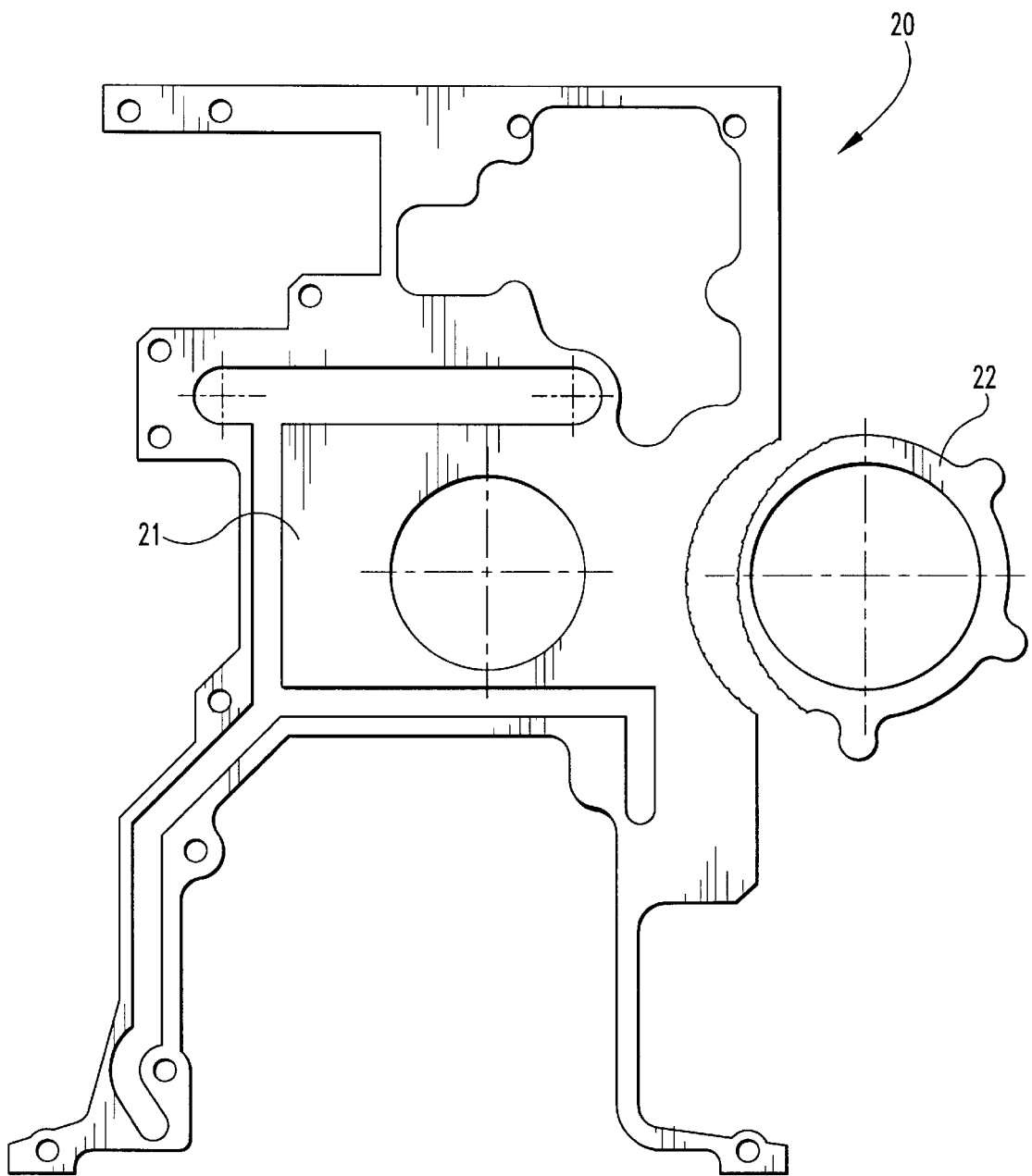
FIG. 2 is a top plan view of the FIG. 1 gasket with the air compressor gasket portion separated.

Gasket 20 is arranged into two primary portions 21 and 22 which are separated by a perforated score line 23. Initially these two portions 21 and 22 are physically and directly connected to each other such that the score line 23 is common to both portions. Perforated score line 23 is a third gasket portion of less or reduced material (compared to a non-perforated portion) due to the presence of perforation apertures 24 which are arranged in a linear series and extending from one edge of gasket 20 to an opposite edge. In lieu of a perforated score line 23, this third gasket portion could be a web of material with a reduced thickness and would by this configuration also be a gasket portion of less or reduced material. A weakened line of some nature positioned between the first gasket portion 21 and the second gasket portion 22 is important so that this weakened line can be severed and thereby separate the second gasket portion 22 from the first gasket portion 21 (see FIG. 2). The preferred fabrication method of steel stamping means that the perforated score line is the preferred weakening technique.

Figure 3:
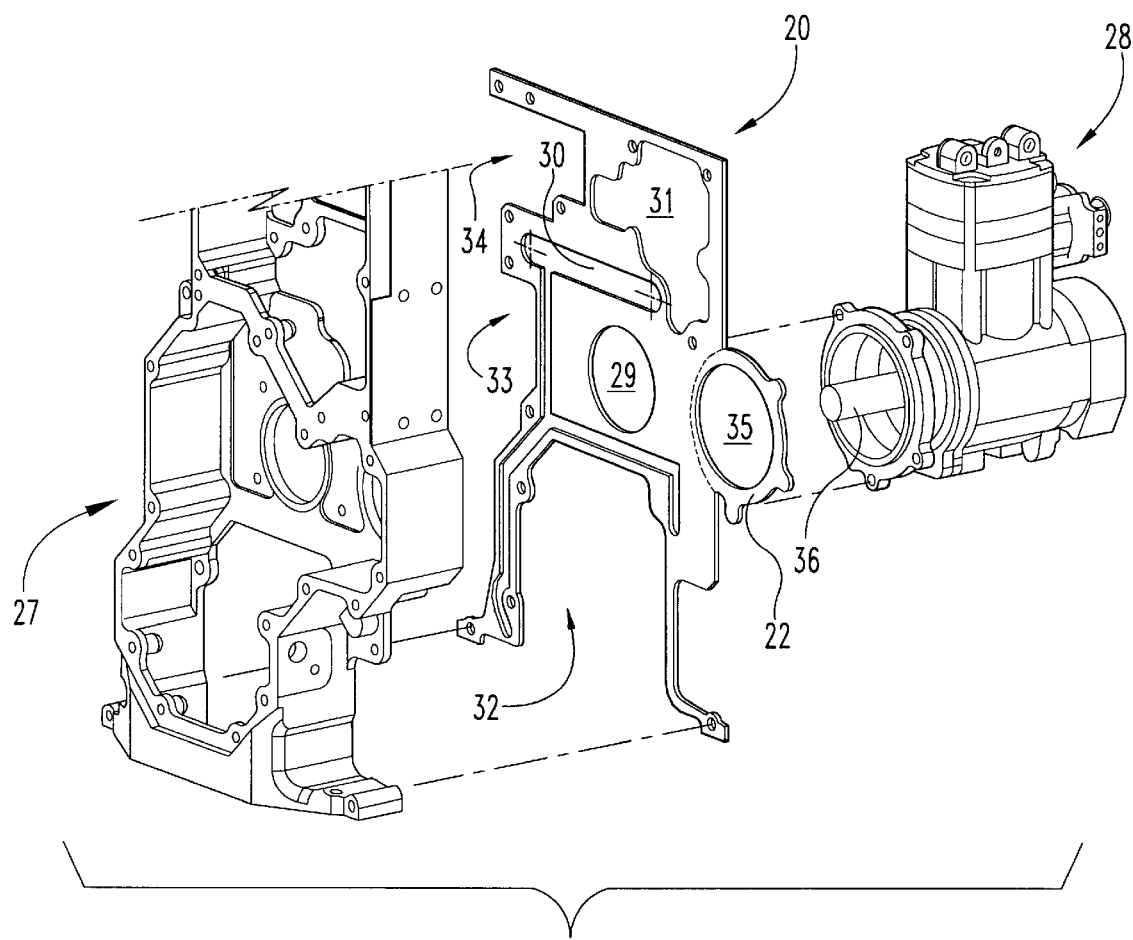
FIG. 3 is an exploded, perspective view of the FIG. 1 gasket as positioned between a gear housing and an air compressor.

In the preferred embodiment (see FIG. 3), gasket portion 21 is designed to provide sealing at the interface between a gear housing 27 and an engine block 25. Gasket portion 22 is designed to provide sealing at the interface between an air compressor 28 and the gear housing 27. When unitary gasket 20 is initially installed as illustrated, sealing at the two interfaces is achieved concurrently. As should be understood from the design of internal combustion engines, such as a diesel engine, the abutting surfaces of the gear housing 27 and the engine block which contact opposite sides of the first gasket portion 21 are machined to be substantially flat and are assembled in a substantially parallel manner. As the gear housing 27 is attached to the engine block, the abutting surfaces of these two components sandwich the first gasket portion 21 therebetween.

When an air compressor is utilized as part of the engine design, it is typically attached to the gear housing 27 at a location which is adjacent to the engine block. Accordingly, the second gasket portion 22 provides the gasket for use in sealing this second interface which is established between the gear housing 27 and the air compressor 28. The abutting surfaces of these two components are machined to be substantially flat and are assembled in a substantially parallel manner. As the air compressor 28 is attached to the gear housing 27, the abutting surfaces sandwich the second gasket portion 22 therebetween.

The first gasket portion 21 of gasket 20 is configured with various openings 29, 30, and 31 and with various notches or relief edges 32, 33, and 34. The second gasket portion 22 includes a center aperture 35 for clearance around the air compressor shaft 36. Various smaller openings for the required attaching hardware are provided as part of each gasket portion 21 and 22.

The use of a single stamping for gasket 20 enables both gasket portions 21 and 22 to be fabricated in one operation, with one setup and using one set of tooling. This level of efficiency as compared to two separate operations, with a second setup and additional tooling, represents one advantage of the present invention.

Once the gear housing 27 is aligned with and assembled to the engine block, with the first gasket portion 21 positioned therebetween, it is preferable that this assembly not be disturbed unless repair or servicing of either component is required. Likewise, once the air compressor 28 is aligned with and assembled to the gear housing 27, with the second gasket portion 22 positioned therebetween, it is preferable that this assembly not be disturbed unless repair or servicing of the air compressor is required. If servicing or repair of some component is required, the accepted procedure is to replace the gasket (or gasket portion) which is positioned between the two components, as has been described. It is assumed that one of those two components must be removed in order for the servicing or repair to be accomplished. Since the original gasket portion disposed between the two components has been tightly clamped in position, there will be localized areas of deformation and some surface contouring. In order to help guarantee that a secure seal can be reestablished between the two components when they are reassembled, a new gasket (or gasket portion) should be installed.

If the air compressor 28 requires servicing or repair and if a new gasket portion is to be installed between the air compressor and the gear housing, a unitary, non-separable gasket would create a clear inefficiency and a greater expense. If gasket 20 was not separable by severing score line 23, then replacement of the air compressor gasket portion would require replacement of the entire gasket 20. This in turn would require the disassembly of the gear housing 27 from the engine block 25, an expensive and time consuming step. In addition, discarding the entire gasket when only one portion actually needs to be replaced adds to the overall expense and inefficiency. These various shortcomings are solved by the present invention.

With the present invention, removal of the air compressor 28 from the gear housing 27 for servicing or repair and the reattachment of the air compressor, including the assembly of a new sealing gasket, can all be accomplished without having to disassemble the gear housing from the engine block. After the air compressor 28 has been serviced and is ready to be reassembled to the gear housing 27, the second gasket portion 22 is manually flexed back and forth about the score line 23 such that the score line is work hardened and soon develops various fracture lines positioned between adjacent perforation apertures 24. With continued manual flexing of second gasket portion 22, these fracture lines extend so as to connect adjacent perforation apertures 24 at which point the second gasket portion 22 is separated from the first gasket portion 21. In lieu of the manual flexing of the second gasket portion 22 it is possible to cut or snip the score line 23 in order to separate the second gasket portion 22 from the first gasket portion 21.

The separable nature of the second gasket portion according to the present invention allows the gear housing to remain assembled to the engine block with the first gasket portion sandwiched therebetween. By means of the present invention, there is no need to disassemble the gear housing 27 from the engine block, nor is there any need to throw away the first gasket portion 21, simply because the air compressor needs to be serviced and as an aspect of such servicing, the second gasket portion 22 is replaced.

When the air compressor 28 is to be reassembled to the gear housing 27, a new "service" gasket is used. The service gasket has a size and shape which is virtually identical to the second gasket portion 22. In this way, the fit of the replacement gasket will be virtually identical to that of the original second gasket portion. The service gasket would only be needed for air compressor replacement or service situations.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A separable, unitary gasket for use in sealing two different component-to-component interfaces, said separable, unitary gasket consisting of:

a first gasket portion constructed and arranged for providing a first sealed interface between a first engine component on one side of said first gasket portion and a second engine component on an opposite side of said first gasket portion;

a second gasket portion constructed and arranged for providing a second sealed interface between said first engine component on one side of said second gasket portion and a third engine component on an opposite side of said second gasket portion;

said first and second gasket portions initially being physically and directly connected to each other as a unitary member and being separable along a perforated, dividing score line which is common to both gasket portions, said unitary gasket being constructed and arranged for positioning between the first engine component on one side of the unitary gasket and the second and third engine components on an opposite side of the unitary gasket so as to concurrently establish said first and second sealed interfaces; and said second gasket portion being separable from said first gasket portion along said dividing score line, separation being desirable when servicing the third engine component and a new interface gasket is going to be used to replace said second gasket portion after said servicing of said third engine component.

2. The separable, unitary gasket of claim 1 wherein said unitary gasket is a substantially flat, steel stamping.

3. A separable, unitary gasket for use in sealing two different component-to-component interfaces, said separable, unitary gasket consisting of:

a first gasket portion constructed and arranged for providing a first sealed interface between a gear housing on one side of said first gasket portion and an engine block on an opposite side of said first gasket portion;

a second gasket portion constructed and arranged for providing a second sealed interface between said gear housing on one side of said second gasket portion and an air compressor on an opposite side of said second gasket portion;

said first and second gasket portions initially being physically and directly connected to each other as a unitary member and being separable along a perforated, dividing score line which is common to both gasket portions, said unitary gasket being constructed and arranged for positioning between the gear housing on one side of the unitary gasket and the engine block and air compressor on an opposite side of the unitary gasket so as to concurrently establish said first and second sealed interfaces; and said second gasket portion being separable from said first gasket portion along said dividing score line, separation being desirable when servicing the air compressor and a new interface gasket is going to be used to replace said second gasket portion after said servicing of said air compressor.

4. The separable, unitary gasket of claim 3 wherein said unitary gasket is a substantially flat, steel stamping.

5. In combination:

an engine block;

a gear housing attached to said engine block;

an air compressor attached to said gear housing; and a separable, unitary gasket constructed and arranged with a first gasket portion which provides a first sealed interface between said gear housing and said engine block, a second gasket portion which provides a second sealed interface between said gear housing and said air compressor, said first and second gasket portions initially being physically and directly connected to each other as a unitary member and being separable from each other along a perforated, dividing score line which is common to both gasket portions, wherein said second gasket portion being separable from said first gasket portion along said dividing score line, separation being desirable when servicing the air compressor and a new interface gasket is going to be used to replace said gasket portion after said servicing of said air compressor.

* * * * *